US010577126B2

(12) United States Patent
Mozer (10) Patent No.: US 10,577,126 B2
(45) Date of Patent: Mar. 3, 2020

(54) DRONE AIRCRAFT LANDING AND DOCKING SYSTEMS

(71) Applicant: Reese A. Mozer, Pittsburgh, PA (US)

(72) Inventor: Reese A. Mozer, Pittsburgh, PA (US)

(73) Assignee: American Robotics, Inc., Marlborough, MA (US)

( * ) Notice: Subject to any disclaimer, the term of this patent is extended or adjusted under 35 U.S.C. 154(b) by 152 days.

(21) Appl. No.: 15/260,771

(22) Filed: Sep. 9, 2016

(65) Prior Publication Data

US 2017/0073084 A1 Mar. 16, 2017

Related U.S. Application Data

(60) Provisional application No. 62/217,318, filed on Sep. 11, 2015.

(51) Int. Cl.
*B64C 39/02* (2006.01)
*B64F 1/00* (2006.01)
*B64F 1/02* (2006.01)
*B64F 1/24* (2006.01)

(52) U.S. Cl.
CPC .............. *B64F 1/02* (2013.01); *B64C 39/024* (2013.01); *B64F 1/007* (2013.01); *B64F 1/24* (2013.01); *B64C 2201/024* (2013.01); *B64C 2201/027* (2013.01); *B64C 2201/18* (2013.01)

(58) Field of Classification Search
CPC .... B64F 1/02; B64F 1/22; B64F 1/222; B64F 1/36; B64F 1/007; B64C 2201/18; B64C 2201/20; B64C 2201/201
See application file for complete search history.

(56) References Cited

U.S. PATENT DOCUMENTS

| 9,448,562 | B1* | 9/2016 | Sirang | G05D 1/0676 |
| 2007/0025809 | A1 | 2/2007 | Lee et al. | |
| 2009/0224097 | A1 | 9/2009 | Kariv | |
| 2011/0174925 | A1* | 7/2011 | Ying | B64F 1/005 244/114 R |
| 2013/0099054 | A1* | 4/2013 | Besenzoni | B63B 17/00 244/110 E |
| 2013/0134260 | A1* | 5/2013 | Besenzoni | B63B 3/48 244/110 E |
| 2015/0175276 | A1* | 6/2015 | Koster | B64F 1/32 244/114 R |

(Continued)

FOREIGN PATENT DOCUMENTS

| JP | 2015-042539 A | 3/2015 |
| WO | WO-2015-108588 A | 7/2015 |

OTHER PUBLICATIONS

International Search Report issued by Authorized Officer Joong Sub Han, of the Korean Intellectual Property Office, dated Nov. 21, 2016, in corresponding International Patent Application No. PCT/US2016/051027.

*Primary Examiner* — Philip J Bonzell
*Assistant Examiner* — Tye William Abell
(74) *Attorney, Agent, or Firm* — Locke Lord LLP; Daniel J. Fiorello (57) ABSTRACT

A docking station for an aircraft includes a base portion and an alignment system disposed on the base portion configured to orient the aircraft relative to the base portion. The alignment system can include a plurality of outer protrusions extending away from the base portion in a vertical direction.

6 Claims, 9 Drawing Sheets

(56) References Cited

U.S. PATENT DOCUMENTS

| | | | |
|---|---|---|---|
| 2015/0266575 A1* | 9/2015 | Borko | B64C 39/024 |
| | | | 701/3 |
| 2015/0353206 A1* | 12/2015 | Wang | B64F 1/00 |
| | | | 244/114 R |
| 2016/0001883 A1* | 1/2016 | Sanz | B64F 1/02 |
| | | | 244/17.23 |
| 2016/0039300 A1* | 2/2016 | Wang | B60L 11/1822 |
| | | | 244/39 |
| 2016/0039540 A1* | 2/2016 | Wang | B64F 1/36 |
| | | | 244/114 R |
| 2016/0039541 A1* | 2/2016 | Beardsley | B60L 11/1816 |
| | | | 701/2 |
| 2016/0144982 A1* | 5/2016 | Sugumaran | B64C 25/32 |
| | | | 244/103 R |
| 2016/0207637 A1* | 7/2016 | Campillo | B64C 39/024 |
| 2016/0257424 A1* | 9/2016 | Stabler | A63H 27/12 |
| 2016/0259333 A1* | 9/2016 | Ducharme | G05D 1/0676 |
| 2016/0311329 A1* | 10/2016 | Rodriguez | B60L 11/182 |
| 2016/0376031 A1* | 12/2016 | Michalski | B64F 1/36 |
| | | | 701/15 |
| 2017/0021942 A1* | 1/2017 | Fisher | B64C 29/02 |
| 2017/0050749 A1* | 2/2017 | Pilskalns | B64F 1/362 |
| 2017/0158353 A1* | 6/2017 | Schmick | B64F 1/007 |
| 2017/0217323 A1* | 8/2017 | Antonini | B60L 11/1816 |
| 2017/0253349 A1* | 9/2017 | Wang | B64F 1/02 |

* cited by examiner

DRONE AIRCRAFT LANDING AND DOCKING SYSTEMS

CROSS-REFERENCE TO RELATED APPLICATIONS

The present application claims priority to U.S. Provisional Patent Application No. 62/217,318, filed on Sep. 11, 2015, the entire contents of which are herein incorporated by reference.

BACKGROUND

1. Field

The present disclosure relates to unmanned and drone aircraft, more specifically to landing and docking systems for unmanned aircraft (e.g., multirotor copters).

2. Description of Related Art

VTOL (vertical take-off and land) aircraft, such as multirotor copters (e.g., quad copters) and similar aircraft, can be configured to charge and/or transfer data through a suitable docking station. Such aircraft can be manually flown to and/or placed onto such a docking station for charging/data transfer. Certain types of these aircraft can be configured as autonomous drones that include software such that the drone can perform one or more functions on its own (e.g., flying a particular route, taking off, landing). These systems can employ GPS navigational mechanisms, vision sensors, distance sensors, or the like.

However, such software, sensors, and related systems inherently include positional errors that lead to misalignment of the drone relative to the docking station. Such misalignment can prevent the drone from making a physical or electromagnetic connection with the docking station, thereby preventing data transfer, object retrieval (e.g., for package delivery), safe enclosure of system, and/or charging of the drone's battery without manual intervention.

Such conventional methods and systems have generally been considered satisfactory for their intended purpose. However, there is still a need in the art for improved landing and docking systems to reduce the need for manual intervention and fully-automate the missions of autonomous aircraft. The present disclosure provides a solution for this need.

SUMMARY

A docking station for an aircraft includes a base portion and an alignment system disposed on the base portion configured to orient the aircraft relative to the base portion. The alignment system can include a plurality of outer and inner protrusions extending away from the base portion in a vertical direction, or a single protrusion mimicking the three-dimensional shape formed by the plurality of protrusions.

The plurality of outer and inner protrusions can extend away from the base portion in both the vertical direction and a horizontal direction such that the outer and inner protrusions extend from the base portion at an angle. The outer protrusions can include a ramp shape and are angled toward a middle of the base portion such that the ramp shape angles down toward the middle of the base portion. The inner protrusions can include a ramp shape and are angled away from a middle of the base portion such that the ramp shape angles down away from the middle of the base portion.

The outer protrusions can be circumferentially disposed about the middle of the base portion to form an outer periphery of a landing area and to register the aircraft toward a middle of the base portion. The inner protrusions can be circumferentially disposed at the middle of the base portion to form an inner periphery of the landing area and to register the aircraft toward a middle of the base portion.

The docking station can further include a landing platform at the middle of the base portion disposed at an upper end of the inner protrusions, as well as a landing platform between the inner and outer protrusions disposed at the lower end of the inner and outer protrusions. The landing platform can include a charging system operatively associated therewith and configured to electrically couple to the aircraft to charge a battery of the aircraft. In certain embodiments, the landing platform includes a data transfer system operatively associated therewith and configured to communicate with the aircraft.

The outer protrusions and the inner protrusions can meet at the base portion. One or more of the outer protrusions and/or inner protrusions can be covered with a covering material (e.g., sheet metal, paper, cloth, plastic, etc., to form an enclosed bowl), or this solid shape can be mimicked with a single, solid three dimensional protrusion.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
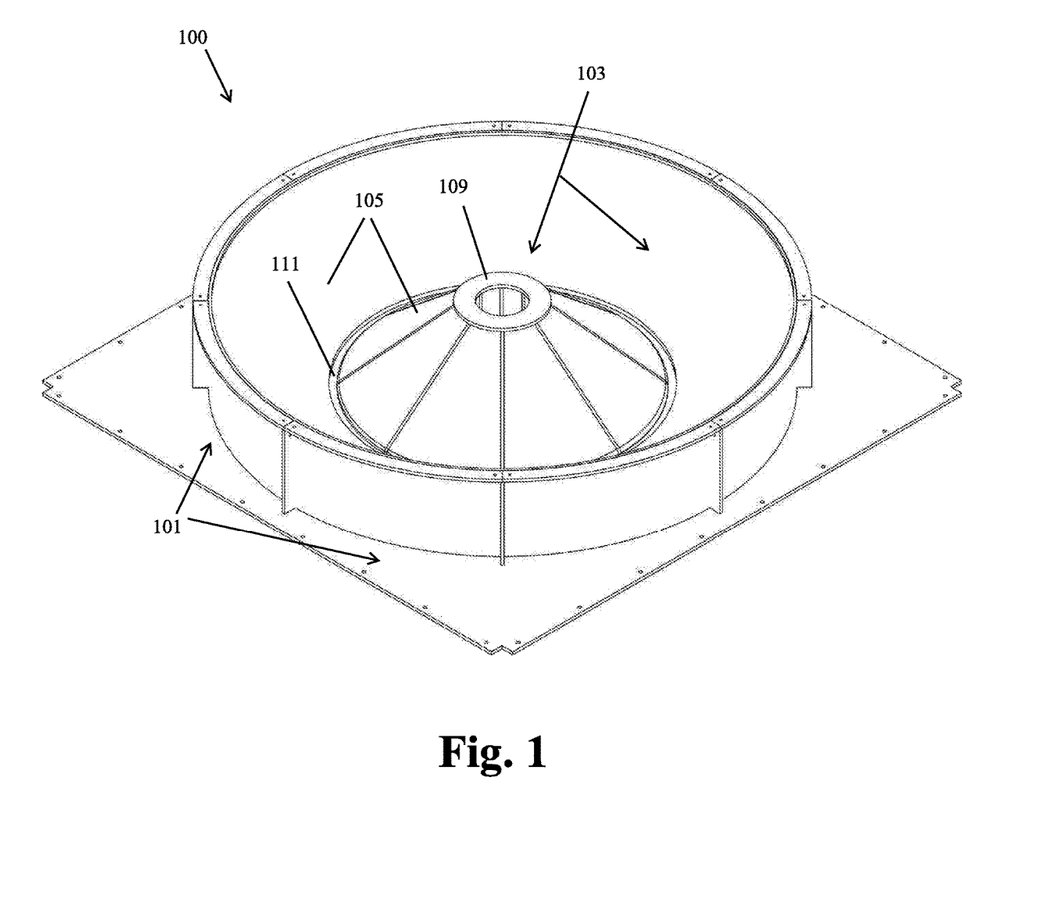
FIG. 1 is a perspective view of an embodiment of a docking station in accordance with this disclosure, shown having covered walls.

Reference will now be made to the drawings wherein like reference numerals identify similar structural features or aspects of the subject disclosure. For purposes of explanation and illustration, and not limitation, an illustrative view of an embodiment of a docking station in accordance with the disclosure is shown in FIG. 1. Other embodiments and/or aspects of this disclosure are shown in FIGS. 2-9. The systems and methods described herein can be used to improve aircraft alignment when landing at a docking station (e.g., for autonomous quad-copters or the like).

Referring to FIGS. 1-9, generally, embodiments of a docking station 100 for an aircraft includes a base portion 101 and an alignment system 103 disposed on the base portion 101 configured to orient the aircraft relative to the base portion 101. The alignment system 403 can include a plurality of outer 407 and inner protrusions 405, e.g., as shown in FIGS. 4-9, extending away from the base portion 401 in a vertical direction, or a single protrusion mimicking the three-dimensional shape formed by the plurality of extrusions 405, 407.

The plurality of outer and inner protrusions 407, 405 can extend away from the base portion 101 in both the vertical direction and a horizontal direction such that the outer and inner protrusions 407, 405 extend from the base portion 101 at an angle. The outer protrusions 407 can include a ramp shape and are angled toward a middle of the base portion 101 such that the ramp shape angles down toward the middle of the base portion 101. The inner protrusions 405 can include a ramp shape and are angled away from a middle of the base portion 101 such that the ramp shape angles down away from the middle of the base portion 101.

The outer protrusions 407 can be circumferentially disposed about the middle of the base portion 101 to form an outer periphery of a landing area and to register the aircraft toward a middle of the base portion 101. The inner protrusions 405 can be circumferentially disposed at the middle of the base portion 101 to form an inner periphery of the landing area and to register the aircraft toward a middle of the base portion 101. These inner protrusions 405 can work in tandem with the outer protrusion 407 to ensure level descent of the vehicle. In other words, the inner and outer protrusions 405, 407 work together to ensure at least two points of contact on between the landing gear of opposite sides of the aircraft and the protrusion surfaces during descent.

The docking station 100 can further include a landing platform 109 at the middle of the base portion 101 disposed at an upper end of the inner protrusions 405, as well as a landing platform 111 between the inner and outer protrusions 405, 407 disposed at the lower end of the inner and outer protrusions 405, 407. The landing platform 109 can include a charging system operatively associated therewith and configured to electrically couple to the aircraft to charge a battery of the aircraft. In certain embodiments, the landing platform 109 includes a data transfer system operatively associated therewith and configured to communicate with the aircraft.

Figure 2:
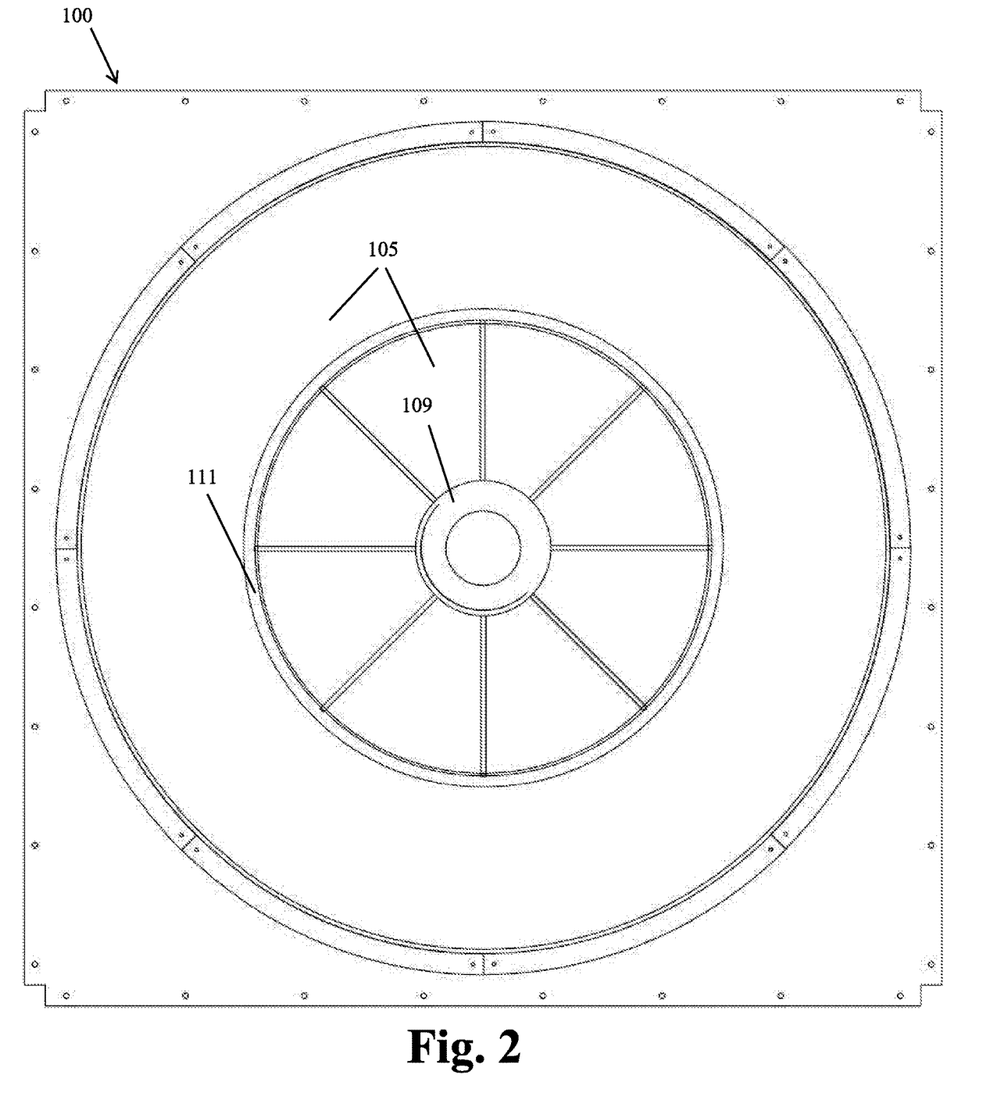
FIG. 2 is a plan view of the docking station of FIG. 1.
Figure 3:
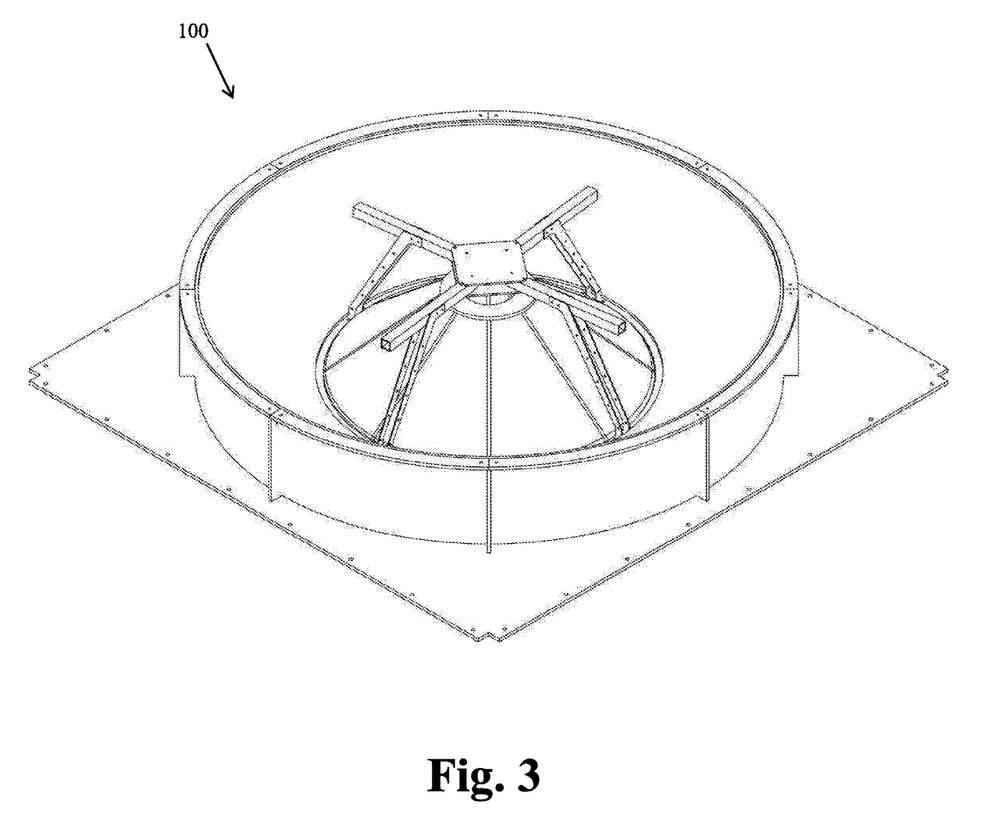
FIG. 3 is a perspective view of the docking station of FIG. 1, showing an aircraft disposed therein.
Figure 4:
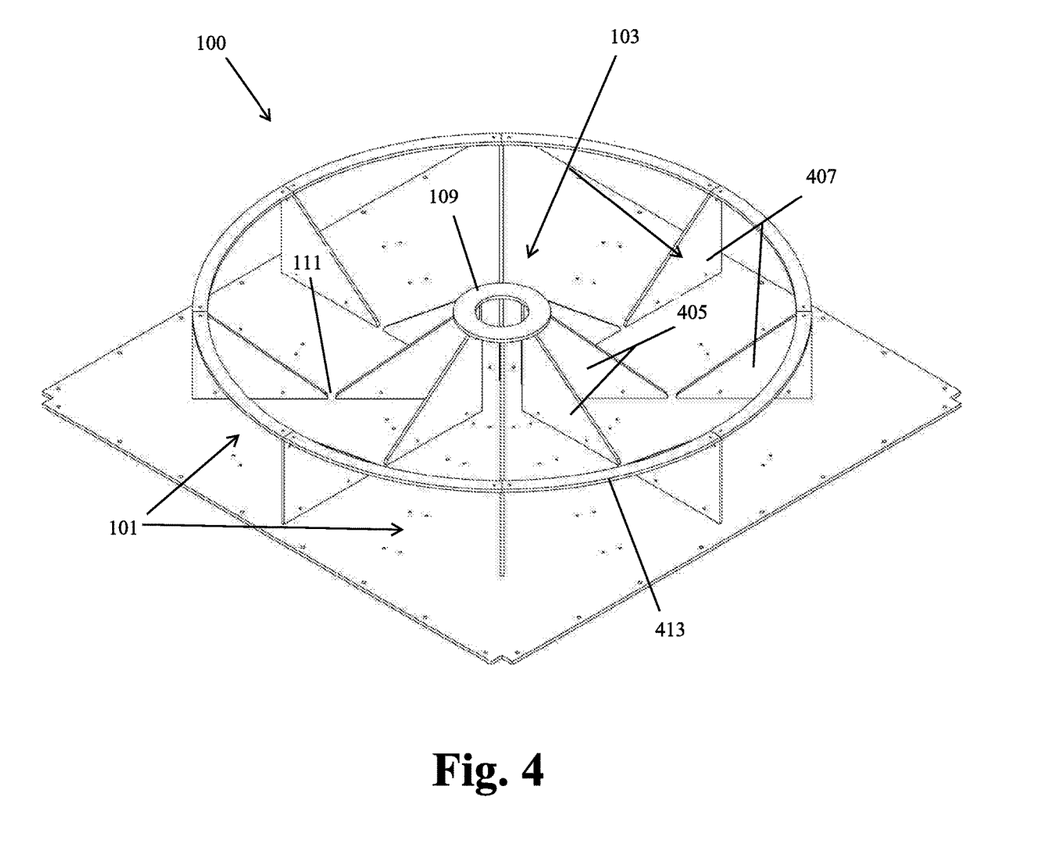
FIG. 4 is a perspective view of an embodiment of a docking station in accordance with this disclosure, showing a skeleton frame with no covering walls.
Figure 5:
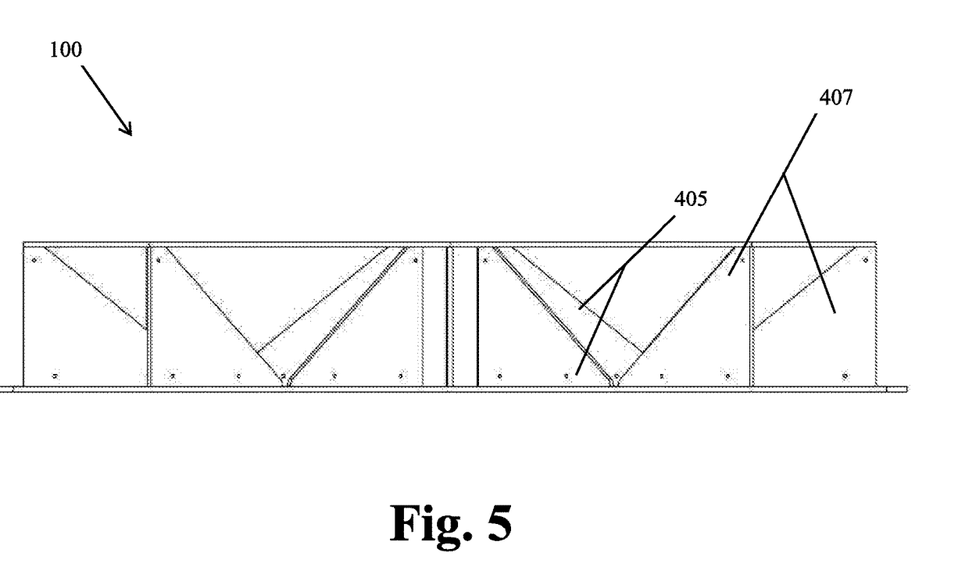
FIG. 5 is a side view of the docking station of FIG. 4.
Figure 6:
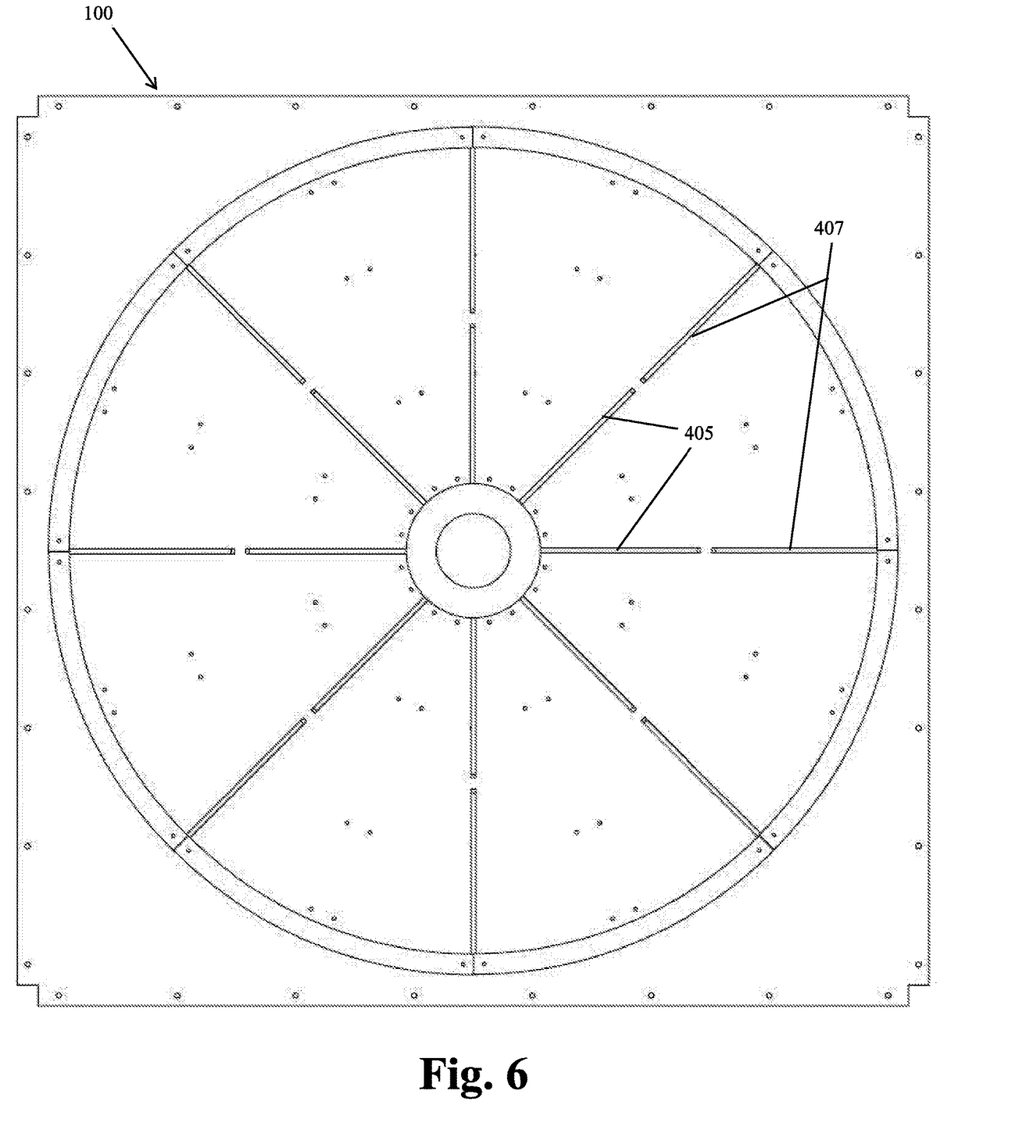
FIG. 6 is a plan view of the docking station of FIG. 4.

The outer protrusions 407 and the inner protrusions 405 can meet at the base portion 101. As shown in FIG. 1-3, one or more of the outer protrusions 407 and/or inner protrusions 401 (not visible in FIGS. 1-3) are covered with a covering material (e.g., sheet metal, paper, cloth, plastic, etc., to form an enclosed bowl), or this solid shape can be mimicked with a single, solid three dimensional protrusion. As shown in FIGS. 4-9, the docking station 100 can include a skeleton frame design without the need for walls or other covering. It is contemplated that the docking station 100 can include a ring 413 connecting the outer protrusions 407 at an upper end thereof as shown in FIGS. 4-9.

As described above, the docking station 100 can be configured for use with any VTOL aircraft (e.g., an autonomous quad-copter) such that it is a VTOL aircraft docking station. For example, a quad-copter can include a body portion and four arms extending therefrom, each arm configured to hold a motor and propeller (not shown) for lifting and controlling the quad-copter. The quad-copter can include a circular landing gear mounted on quad-copter to achieve to improve landing performance within the docking station. Any other suitable landing gear compatible with the landing platform dimensions of the docking station is contemplated herein.

Figure 7:
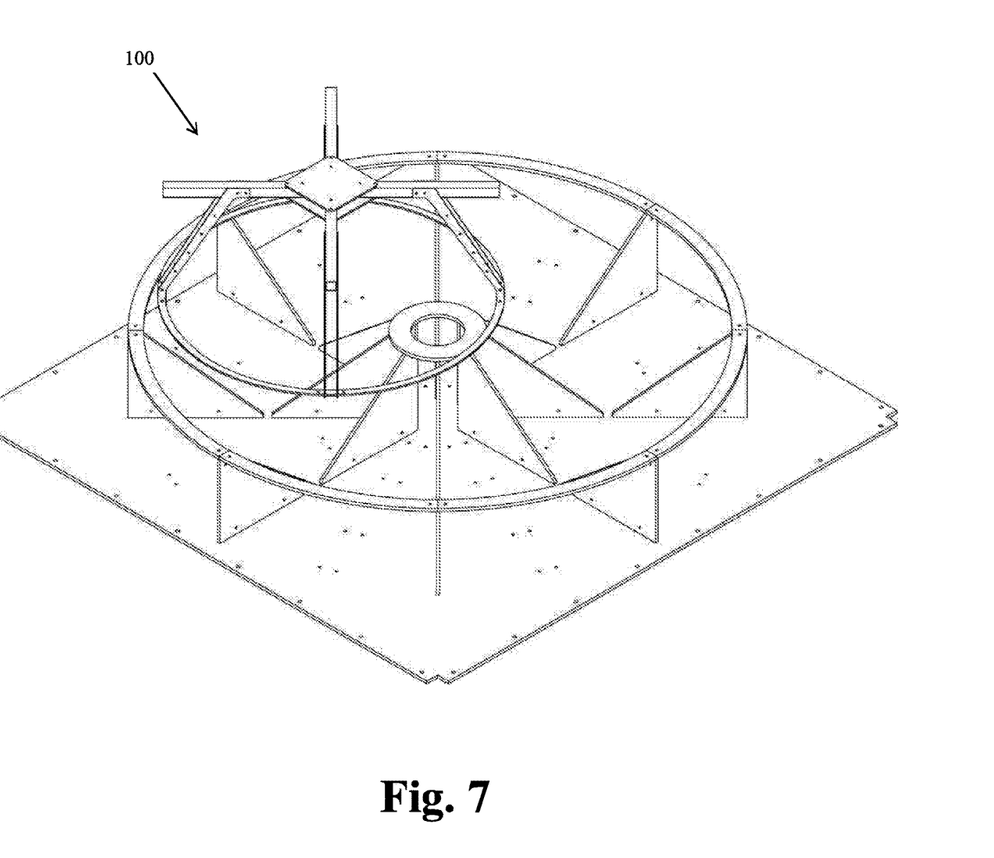
FIG. 7 is a perspective view of the docking system of FIG. 4, showing an aircraft misaligned and attempting to land therein.

During landing, the quad-copter can position itself or can be positioned by a user over the docking station imperfectly due to inherent errors in the precision of autonomous navigation and/or control software and/or or manual user error (e.g., as shown in FIG. 7).

Figure 8:
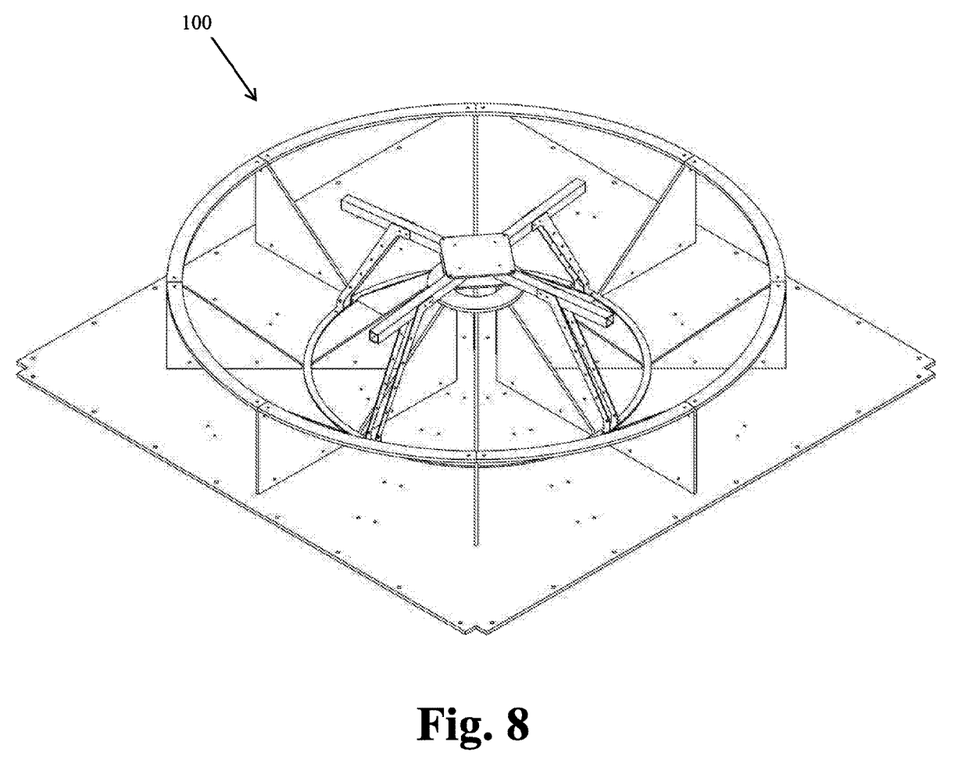
FIG. 8 is a perspective view of the docking system of FIG. 4, showing the aircraft properly registered within the docking station after being misaligned.
Figure 9:
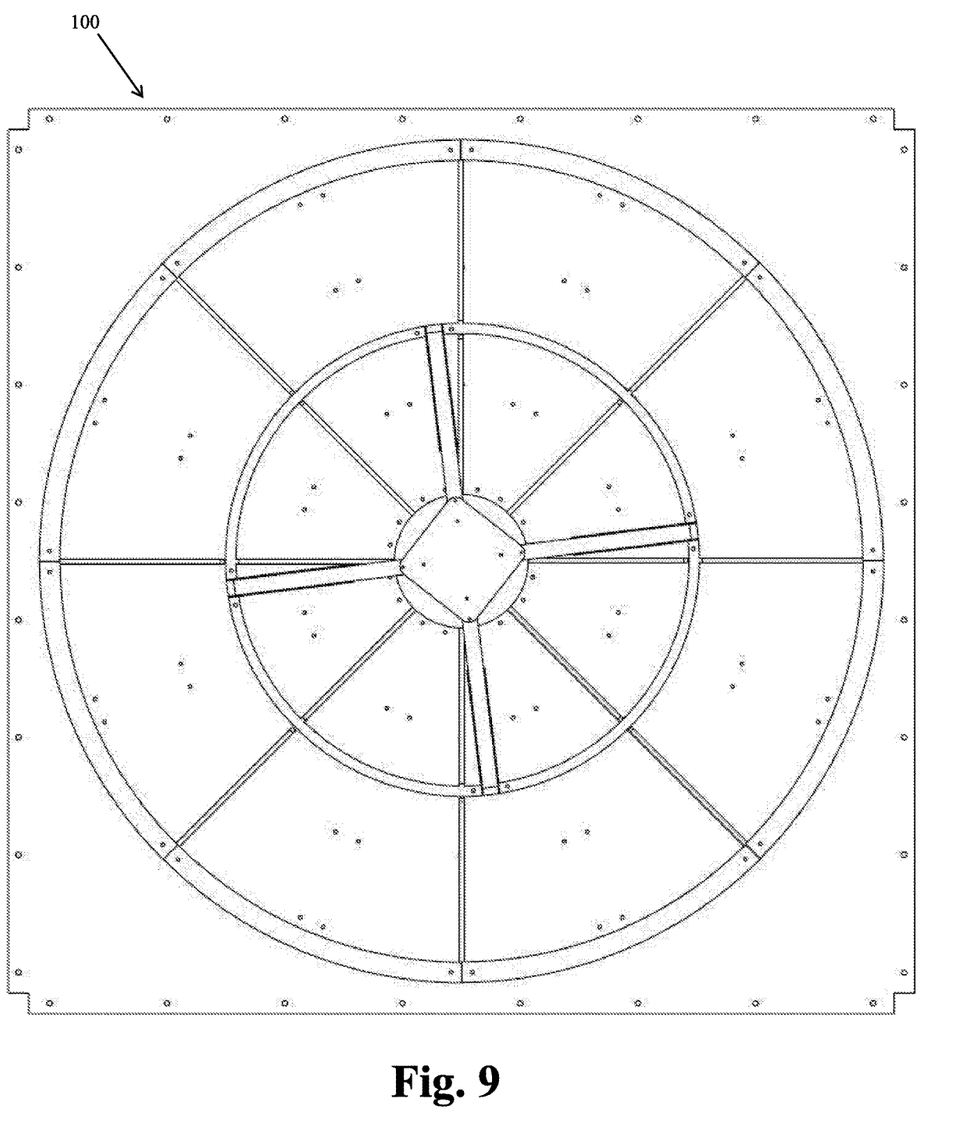
FIG. 9 is a plan view of the docking system of FIG. 4, showing the aircraft properly registered therein.

When the quad-copter reaches its lowest point at the center, between the inner and outer protrusions, and rests on the landing platform, it can be put into communication with the charging system and/or data transfer system by being medialised and/or oriented properly (as shown in FIGS. 8 and 9).

The methods and systems of the present disclosure, as described above and shown in the drawings, provide for aircraft docking stations with superior properties including alignment systems for guiding aircraft into the docking stations. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A docking station for an aircraft, comprising:
a base portion; and
an alignment system disposed on the base portion configured to orient the aircraft relative to the base portion;
wherein the alignment system includes a plurality of inner and outer protrusions extending away from the base portion in a vertical direction or a single protrusion mimicking a three-dimensional shape formed by the plurality of inner and outer protrusions;
wherein the plurality of inner and outer protrusions extend away from the base portion in both the vertical direction and a horizontal direction such that the outer protrusions extend from the base portion at an angle;
wherein the outer protrusions include ramp shape and are angled toward a middle of the base portion such that the ramp shape angles down toward the middle of the base portion;
wherein the outer protrusions are circumferentially disposed about the middle of the base portion to form an outer periphery of a landing area and to urge the aircraft toward a middle of the base portion; and
wherein the inner protrusions include ramp shape and are angled away from a middle of the base portion such that the ramp shape angles down away from the middle of the base portion.

2. The docking station of claim 1, wherein the outer protrusions and the inner protrusions meet at the base portion.

3. The docking station of claim 1, wherein one or more of the outer protrusions and/or inner protrusions are covered with a covering material.

4. The docking station of claim 1, further comprising a landing platform at the middle of the base portion disposed at an upper end of the inner protrusions.

5. The docking station of claim 4, wherein the landing platform includes a charging system operatively associated therewith and configured to electrically couple to the aircraft to charge a battery of the aircraft.

6. The docking station of claim 5, wherein the landing platform includes a data transfer systemoperatively associated therewith and configured to communicate with the aircraft.

\* \* \* \* \*